US009432119B2

(12) United States Patent
Copper et al.

(10) Patent No.: US 9,432,119 B2
(45) Date of Patent: Aug. 30, 2016

(54) CONTACTLESS FIBER OPTIC CONNECTOR ASSEMBLIES

(71) Applicant: Tyco Electronics Corporation, Berwyn, PA (US)

(72) Inventors: Charles Dudley Copper, Hummelstown, PA (US); Sean Patrick McCarthy, Palmyra, PA (US); Terry Patrick Bowen, Dillsburg, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 294 days.

(21) Appl. No.: 13/870,448

(22) Filed: Apr. 25, 2013

(65) Prior Publication Data

US 2014/0270790 A1 Sep. 18, 2014

Related U.S. Application Data

(60) Provisional application No. 61/785,300, filed on Mar. 14, 2013.

(51) Int. Cl.

| | |
|---|---|
| ***H04B 10/00*** | (2013.01) |
| ***H04B 10/2575*** | (2013.01) |
| ***H04B 10/80*** | (2013.01) |
| *G02B 6/43* | (2006.01) |

(52) U.S. Cl.
CPC ........ *H04B 10/2575* (2013.01); *H04B 10/801* (2013.01); *G02B 6/43* (2013.01)

(58) Field of Classification Search
None
See application file for complete search history.

(56) References Cited

U.S. PATENT DOCUMENTS 5,241,410 A * 8/1993 Streck .................. H04M 1/737 379/56.3
6,650,808 B1 * 11/2003 Vujcic ............... H04B 10/1143 385/134
6,967,347 B2 * 11/2005 Estes et al. ..................... 257/25
7,153,043 B1 * 12/2006 Zhang et al. .................. 385/92

(Continued)

FOREIGN PATENT DOCUMENTS

CN 202563539 U 11/2012

OTHER PUBLICATIONS

Sreekanth, Digital Microwave Communication Systems: with selected topics in Mobile Communications, 2003, Universities Press, pp. 350-351.*

(Continued)

*Primary Examiner* — Ken N Vanderpuye
*Assistant Examiner* — Jai Lee

(57) ABSTRACT

A contactless connector module includes first and second fiber optic connector assemblies. The first fiber optic connector assembly includes a first fiber optic cable and a first connector provided at an end of the first fiber optic cable. The first connector includes a first converter converting between optical and electrical signals and a first communication chip electrically connected to the first converter. The first communication chip is configured to transmit wireless RF signals. The second fiber optic connector assembly includes a second fiber optic cable and a second connector provided at an end of the second fiber optic cable. The second connector includes a second converter converting between optical and electrical signals and a second communication chip electrically connected to the second converter. The second communication chip is configured to receive the wireless RF signals from the first communication chip.

20 Claims, 2 Drawing Sheets

(56) References Cited

U.S. PATENT DOCUMENTS

2003/0002100 A1* 1/2003 Izadpanah .................... 359/124
2004/0047313 A1* 3/2004 Rumpf et al. ................ 370/335
2007/0063914 A1* 3/2007 Becker .................. A62C 35/60 343/840
2007/0087780 A1* 4/2007 Nassimi ............. H04M 1/6066 455/556.1
2009/0028122 A1* 1/2009 Ikeda .................... H04W 12/04 370/338
2009/0245808 A1* 10/2009 Rofougaran ...... H01L 23/49816 398/141
2010/0150566 A1* 6/2010 Soto ..................... H04B 10/272 398/115
2011/0142451 A1* 6/2011 Shi ........................... H04B 1/40 398/115
2012/0068890 A1* 3/2012 Haroun ................... H01L 23/66 343/702
2013/0163483 A1* 6/2013 Sarraf .................... H01Q 1/521 370/277
2013/0274611 A1* 10/2013 Silveira ................ A61B 5/0059 600/476
2014/0029934 A1* 1/2014 Xia .................... H04B 10/0771 398/20
2014/0270800 A1* 9/2014 Masarik ............ H04B 10/2503 398/131
2014/0321810 A1* 10/2014 Leigh .................. H01R 13/641 385/71
2015/0050019 A1* 2/2015 Sengupta ................ H04J 14/04 398/44

OTHER PUBLICATIONS

Bakshi et al., Antennas & Wave Propagation, 2008, Technical Publications Pune, pp. 6-1 to 6-3.*
Bensky, Allan, Short-range Wireless Communication:Fundamentals of RF System Design and Applicaton, 2004, Elsevier Inc., 2nd Edition, pp. 204.*
Khandpur, R. S., Printed Circuit Boards: Design, Fabrication, Assembly and Testing, 2005, Tata McGraw-Hill Publishing Company Limited, pp. 1-2.*
Rajput, R.K., Basic Electrical and Electronics Engineering, 2006, Firewall Media, p. 640-641.*
Office Action mailed Apr. 3, 2015 in CN 201410095365.7 (counterpart of U.S. Appl. No. 13/870,448).

* cited by examiner

CONTACTLESS FIBER OPTIC CONNECTOR ASSEMBLIES

CROSS-REFERENCE TO RELATED APPLICATIONS

The present application claims the benefit of U.S. Provisional Patent Application No. 61/785,300 filed on Mar. 14, 2013, which is incorporated herein by reference in its entirety.

BACKGROUND OF THE INVENTION

The subject matter herein relates generally to contactless connectors that provide contactless data transmission between fiber optic components at short range using RF energy.

Fiber optic cables are used in telecommunications and other applications. Due to much lower attenuation and interference, fiber optic cables have large advantages over existing copper wire applications, such as in long-distance and high-demand applications. The fiber optic cables are flexible, transparent fibers made of glass or plastic that function as a light pipe to transmit light between the two ends of the optical fiber. Fiber-optic communication permits transmission over longer distances and at higher bandwidths (data rates) than other forms of communication. Fibers are used instead of metal wires because signals travel along them with less loss and are also immune to electromagnetic interference.

Fiber optic cables may be connected to each other by connectors or by splicing, that is, joining two fibers together to form a continuous optical light pipe. Joining lengths of fiber optic cable is more complex than joining electrical wire or cable. The ends of the fibers must be carefully cleaved (cut), and then spliced together, either mechanically or by fusing them with heat. The generally accepted splicing method is arc fusion splicing, which melts the fiber ends together with an electric arc. Typically, the ends are cleaved (cut) with a precision cleaver to make them perpendicular, and are placed into special holders in the splicer. The splice is usually inspected via a magnified viewing screen to check the cleaves before and after the splice. The splicer uses small motors to align the end faces together, and emits a small spark between electrodes at the gap to burn off dust and moisture. Then the splicer generates a larger spark that raises the temperature above the melting point of the glass, fusing the ends together permanently. The location and energy of the spark is carefully controlled so that the molten core and cladding do not mix, and this minimizes optical loss. Splicing of two fiber optic cables is time consuming and requires precision alignment. Splicing is typically performed in a factory plant or in a specially configured mobile van using expensive equipment and is not typically performed in unprotected field environments due to the tight tolerances (e.g., alignment at the micron level) and the need for very clean surfaces.

For quicker fastening jobs, a mechanical fiber splice has been known to be used. Mechanical fiber splices are designed to be quicker and easier to install, but there is still the need for stripping, careful cleaning and precision cleaving. The fiber ends are aligned and held together by a precision-made sleeve, often using a clear index-matching gel that enhances the transmission of light across the joint. Such joints typically have higher optical loss and are less robust than fusion splices, especially if the gel is used.

A need remains for a system and method of connecting fiber optic components, such as two fiber optic cables, without the need for precision or mechanical splices between the fiber optic cables.

BRIEF SUMMARY OF THE INVENTION

In one embodiment, a contactless connector module is provided that includes first and second fiber optic connector assemblies. The first fiber optic connector assembly includes a first fiber optic cable and a first connector provided at an end of the first fiber optic cable. The first connector includes a first converter converting between optical and electrical signals and a first communication chip electrically connected to the first converter. The first communication chip is configured to transmit wireless RF signals. The second fiber optic connector assembly includes a second fiber optic cable and a second connector provided at an end of the second fiber optic cable. The second connector includes a second converter converting between optical and electrical signals and a second communication chip electrically connected to the second converter. The second communication chip is configured to receive the wireless RF signals from the first communication chip.

Optionally, a data transmission path may be defined between the first and second fiber optic cables. The data transmission path may include the wireless RF signals between the first and second communication chips. Optical signals from the first fiber optic cable may be converted to electrical signals by the first converter. The electrical signals may be transmitted to the first communication chip. The first communication chip may convert the electrical signals to RF signals and may wirelessly transmit the RF signals to the second communication chip. The RF signals may be directed in a nonlinear path.

Optionally, the first fiber optic connector assembly may convert optical signals to wireless RF signals. The first fiber optic connector assembly may transmit the RF signals wirelessly to the second fiber optic connector assembly. The second fiber optic connector assembly may convert the RF signals to optical signals. Optionally, the second communication chip may transmit wireless RF signals and the first communication chip may receive the wireless RF signals from the second communication chip. The RF signals may be directed in a nonlinear path.

Optionally, the contactless connector module may include a RF waveguide between the first communication chip and the second communication chip. The RF waveguide may transmit the RF signals. The RF waveguide may transmit the RF signals along a nonlinear path.

Optionally, the first connector may include a housing having a mating end and the second connector may include a housing having a mating end. The mating end of the second connector may be mated with the mating end of the first connector. The wireless RF signals may be transmitted within the housings of the first and second connectors. The RF signals may be directed in a nonlinear path. The first connector may include a circuit board within the housing. The first converter and the first communication chip may be mounted to the circuit board. Electrical signals may be transmitted between the first converter and the first communication chip along the circuit board. The first connector may include a power transmitter and the second connector may include a power receiver. Electrical energy may be transmitted wirelessly between the power transmitter and the power receiver.

Optionally, the first connector may be part of a pluggable card that includes a first housing having a mating end and the second connector may include a second housing having a mating end that is mounted on a backplane. The pluggable card may include electrical to optical and optical to electrical converters which couple to optical waveguides/optical fibers as part of the pluggable card. The first converter and the first communication chip may be mounted to the pluggable card within the first housing. The mating end of the first connector may be mated with the mating end of the second connector when the card is plugged into the backplane. The wireless RF signals may be transmitted within the housings of the first and second connectors. The RF signals may be directed in a nonlinear path. The second connector includes a second communication chip that is configured to receive the wireless RF signals from the first communication chip, and a second converter converting between electrical and optical signals on the backplane. The optical signals couple to optical waveguides/optical fibers as part of the backplane.

In another embodiment, a contactless connector module is provided having a first fiber optic connector assembly having a first fiber optic cable and a first connector provided at an end of the first fiber optic cable. The contactless connector module includes a second fiber optic connector assembly having a second fiber optic cable and a second connector provided at an end of the second fiber optic cable. The second connector communicates with the first connector via wireless RF signals.

In a further embodiment, a contactless connector module is provided having a first fiber optic connector assembly having a first fiber optic cable and a first connector provided at an end of the first fiber optic cable. The first connector has a housing extending between a cable end and a mating end. The contactless connector module includes a second fiber optic connector assembly having a second fiber optic cable and a second connector provided at an end of the second fiber optic cable. The second connector has a housing extending between a cable end and a mating end. The mating end of the second connector is mated with the mating end of the first connector. A data transmission path is defined between the first fiber optic cable and the second fiber optic cable. The data transmission path includes optical signals through the first and second fiber optic cables. The data transmission path includes wireless RF signals through the first and second connectors.

DETAILED DESCRIPTION OF SPECIFIC EMBODIMENTS OF THE INVENTION

Figure 1:
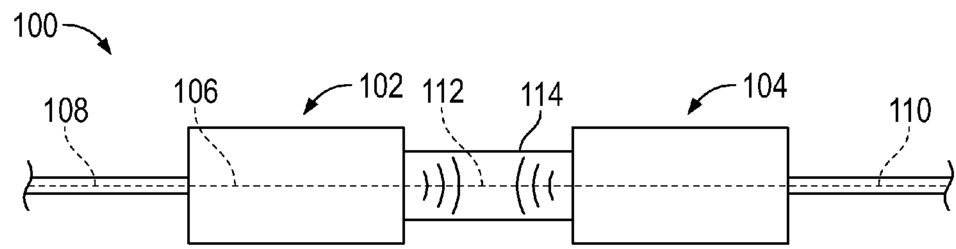
FIG. 1 illustrates a contactless connector module formed in accordance with an exemplary embodiment.

FIG. 1 illustrates a contactless connector module 100 formed in accordance with an exemplary embodiment. The contactless connector module 100 provides contactless data transmission between fiber optic components at short range using RF energy. The contactless connector module 100 includes a first fiber optic connector assembly 102 and a second fiber optic connector assembly 104 that communicates with the first fiber optic connector assembly 102. Communication between the first and second fiber optic connector assemblies 102, 104 is achieved wirelessly via wireless RF signals. For purposes of the present disclosure, the term "RF" is used broadly to include a wide range of electromagnetic transmission frequencies including, for instance, those falling within the radio frequency, microwave or millimeter wave frequency ranges. The communication may be duplex or two way communication between the fiber optic connector assemblies 102, 104.

A data transmission signal path 106 is defined by the contactless connector module 100. The data transmission signal path 106 includes optical signals 108 transmitted to and from the first fiber optic connector assembly 102 and optical signals 110 transmitted to and from the second fiber optic connector assembly 104. The data transmission signal path 106 includes RF signals 112 transmitted between the first and second fiber optic connector assemblies 102, 104. The first fiber optic connector assembly 102 converts the data signals between the optical signals 108 and RF signals 112 to achieve wireless communication with the second fiber optic connector assembly 104. The second fiber optic connector assembly 104 converts between the optical signals 110 and the RF signals 112 to communicate wirelessly with the first fiber optic connector assembly 102.

In an exemplary embodiment, the RF signals 112 may be transmitted between the first and second fiber optic connector assemblies 102, 104 by an RF waveguide 114; however the RF signals 112 may be transmitted across an air gap rather than by the waveguide 114 in alternative embodiments. The RF signals 112 may be transmitted in both directions between the fiber optic connector assemblies 102, 104. The RF waveguide 114 may direct the RF signals 112 between the first and second fiber optic connector assemblies 102, 104. The RF waveguide 114 may transmit the RF signals 112 linearly between the first and second fiber optic connector assemblies 102, 104. Alternatively, the RF waveguide 114 may direct the RF signals 112 along a nonlinear path, such as through a 90 degree bend such that the first and second fiber optic connector assemblies 102, 104 may be oriented perpendicular to one another. The RF waveguide 114 may allow the first and second fiber optic connector assemblies 102, 104 to be oriented at other angular orientations with respect to one another in alternative embodiments.

The RF waveguide 114 is used to direct the RF signals 112 along a predetermined path. Optionally, the waveguide 114 may provide shielding from interference signals. The waveguide 114 may be a hollow metal tube, such as a copper tube. The waveguide 114 may be manufactured from other materials, such as plastic, ceramic, glass or other materials. The waveguide 114 may be manufactured from multiple pieces. Optionally, an air gap may be provided between the pieces of the waveguide 114. The pieces of the waveguide 114 may be movable relative to one another. The waveguide 114 may include reflectors that direct the RF signals along predetermined paths. Optionally, the waveguide 114 may be flexible to allow the data transmission signal path 106 to change shape. Optionally, the waveguide 114 may be cylindrical or may have other shapes in alternative embodiments. The waveguide 114 may extend along a longitudinal axis or may extend along a curved or angled path.

Figure 2:
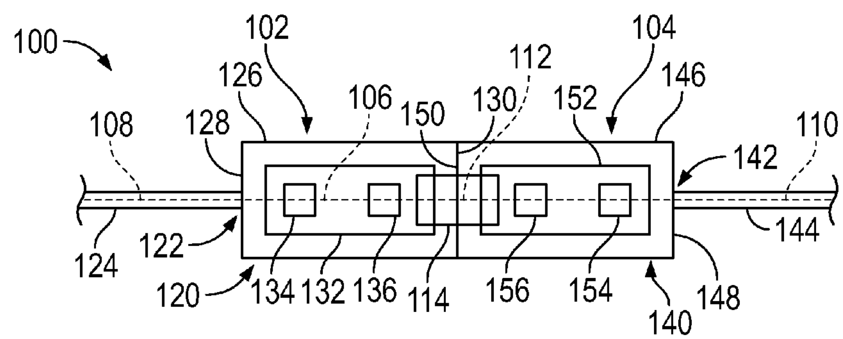
FIG. 2 is a schematic illustration of the contactless connector module.

FIG. 2 is a schematic illustration of the contactless connector module 100 formed in accordance with an exemplary embodiment. The first fiber optic connector assembly 102 includes a first connector 120 provided at an end 122 of a fiber optic cable 124. The optical signals 108 (shown in FIG. 1) along the data transmission signal path 106 may be transmitted to and/or from the first connector 120 by the fiber optic cable 124.

In an exemplary embodiment, the first connector 120 includes a housing 126 extending between a cable end 128 and a mating end 130. The housing 126 is mated to the second fiber optic connector assembly 104 at the mating end 130. In an exemplary embodiment, the first connector 120 includes a first circuit board 132 held in the housing 126. The first connector 120 includes a first converter 134 mounted to the circuit board 132 and a first communication chip 136 mounted to the circuit board 132.

The converter 134 is coupled to the end 122 of the fiber optic cable 124. The converter 134 is configured to convert between optical signals and electrical signals. For example, the converter 134 may receive the optical signals 108 from the fiber optic cable 124 and convert the optical signals 108 to electrical signals that are transmitted along the circuit board 132.

The communication chip 136 is electrically connected to the converter 134 via circuits of the circuit board 132. The communication chip 136 is configured to convert the data signals between electrical signals and the RF signals 112. For example, the communication chip 136 may receive the electrical signals from the converter 134 and convert the electrical signals to the RF signals 112. The RF signals 112 may be transmitted from the communication chip 136 to the second fiber optic connector assembly 104. Optionally, the communication chip 136 may be configured to receive RF signals from the second fiber optic connector assembly 104 in addition to, or in the alternative to, transmitting RF signals. In an exemplary embodiment, the communication chip 136 includes an antenna for wirelessly transmitting and/or receiving the RF signals.

In an exemplary embodiment, the communication chip 136 is configured to receive the RF signals 112 from the second fiber optic connector assembly 104 and convert the RF signals 112 to electrical signals. The electrical signals are transmitted from the communication chip 136 to the converter 134 by the circuit board 132. The converter 134 converts the electrical signals received from the communication chip 136 into optical signals and transmits the optical signals along the fiber optic cable 124. In such embodiment, the first fiber optic connector assembly 102 is configured to both transmit and receive data signals along the data transmission signal path 106.

Optionally, the converter 134 and communication chip 136 may be implemented in a single component that converts the optical signals 108 to the RF signals 112. For example, the communication chip 136 may include a converter. The converter 134 may be directly connected to the communication chip 136. Such embodiment may eliminate the need for transmitting electrical signals along the circuit board 132.

The second fiber optic connector assembly 104 includes a second connector 140. The second connector 140 is provided at an end 142 of a fiber optic cable 144. The optical signals 110 (shown in FIG. 1) along the data transmission signal path 106 may be transmitted to and/or from the second connector 140 by the fiber optic cable 144.

In an exemplary embodiment, the second connector 140 includes a housing 146 extending between a cable end 148 and a mating end 150. The housing 146 is mated to the first fiber optic connector assembly 102 at the mating end 150. In an exemplary embodiment, the second connector 140 includes a second circuit board 152 held in the housing 146.

The second connector 140 includes a second converter 154 mounted to the circuit board 152 and a second communication chip 156 mounted to the circuit board 152.

The converter 154 is coupled to the end 142 of the fiber optic cable 144. The converter 154 is configured to convert between optical signals and electrical signals. For example, the converter 154 may receive the optical signals 110 from the fiber optic cable 144 and convert the optical signals 110 to electrical signals that are transmitted along the circuit board 152.

The communication chip 156 is electrically connected to the converter 154 via circuits of the circuit board 152. The communication chip 156 is configured to convert the data signals between electrical signals and the RF signals 112. For example, the communication chip 156 may receive the electrical signals from the converter 154 and convert the electrical signals to the RF signals 112. The RF signals 112 may be transmitted from the communication chip 156 to the first fiber optic connector assembly 102, such as to the first communication chip 136. The communication chip 156 may receive the RF signals 112 from the first communication chip 136 and convert the RF signals 112 to electrical signals, which are sent to the converter 154. In an exemplary embodiment, the communication chip 156 includes an antenna for wirelessly transmitting and/or receiving the RF signals.

In an exemplary embodiment, the communication chip 156 is configured to receive the RF signals 112 from the first fiber optic connector assembly 102 and convert the RF signals 112 to electrical signals. The electrical signals are transmitted from the communication chip 156 to the converter 154 by the circuit board 152. The converter 154 converts the electrical signals received from the communication chip 156 into the optical signals 110 and transmits the optical signals 110 along the fiber optic cable 144. In such embodiment, the second fiber optic connector assembly 104 is configured to both transmit and receive data signals along the data transmission signal path 106.

Optionally, the converter 154 and communication chip 156 may be implemented in a single component that converts the optical signals 110 to the RF signals 112. For example, the communication chip 156 may include a converter. The converter 154 may be directly connected to the communication chip 156. Such embodiment may eliminate the need for transmitting electrical signals along the circuit board 152.

The mating end 150 of the housing 146 of the second connector 140 is configured to be mated directly to the mating end 130 of the housing 126 of the first connector 120. The housings 126, 146 may have any size or shape depending on the particular application. The housings 126, 146 may be box-shaped, circular or may have other shapes. The housings 126, 146 may include latches or other types of securing features to couple the housings 126, 146 together. The housings 126, 146 may be threadably coupled together. The housings 126, 146 may have a standard mating interface. Optionally, the housings 126, 146 may be configured to receive standard fiber optic connectors, such as FC connectors, SC connectors, LC connectors, or other standard types of fiber optic connectors provided at the end of the fiber optic cables 124, 144. For example, the connectors 120, 140 may define SFP type transceivers. The fiber optic connectors are mated with the converters 134, 154 within the connectors 120, 140 and the connectors 120, 140 convert the optical signals to RF signals for communication between the connectors 120, 140.

When the housings 146, 126 are mated, the communication chips 156, 136 are aligned and positioned to wirelessly communicate with one another. The RF signals 112 are passed along the data transmission signal path 106 between the communication chips 136, 156. Optionally, the waveguide 114 may be received in the housing 126 and/or the housing 146 between the communication chips 136, 156. Alternatively, the communication chips 136, 156 may communicate wirelessly through the air space defined between the communication chip 136 and the communication chip 156.

In an alternative embodiment, rather than connecting the housings 126, 146 together, the housings 126, 146 may be held apart from one another, while still allowing the wireless communication of the RF signals 112 between the communication chip 136 and the communication chip 156. For example, the waveguide 114 may extend between the housings 126, 146. In another alternative embodiment, rather than having separate housings 126, 146, the contactless connector module 100 may include a single housing having both circuit boards 132, 152 received therein.

In an exemplary embodiment, data signals traveling along the data transmission path enter the housing 126 of the first connector 120 at the cable end 128 thereof as optical signals. Data signals traveling along the data transmission path between the cable end 128 and the mating end 130 of the housing 126 of the first connector 120 are electrical signals, at least along a portion of the data transmission path. The data signals traveling along the data transmission path exit the housing 126 of the first connector 120 at the mating end 130 thereof, such as into the housing 146 of the second connector 140, as wireless RF signals. At the second fiber optic connector assembly 104, data signals traveling along the data transmission path enter the housing 146 of the second connector 140 at the mating end 150 thereof as RF signals. Data signals traveling along the data transmission path between the mating end 150 and the cable end 148 of the housing 146 of the second connector 140 are electrical signals, at least along a portion of the data transmission path. The data signals traveling along the data transmission path exit the housing 146 of the second connector 140 at the cable end 150 thereof, such as into the fiber optic cable 144, as optical signals.

Using the wireless RF communication between the first and second connectors 120, 140 eliminates the need for splicing the fiber optic cable 124 and the fiber optic cable 144. The data signals may be transmitted from the fiber optic cable 124 to the fiber optic cable 144 without the need for precisely aligning the fiber optic cables 124, 144 and without the need for clean interfaces between the first and second connectors 120, 140. The connection between the first and second connectors 120, 140 may be made in the field as the wireless interface between the communication chips 136, 156 does not need to be kept clean or held to the same high standards for making the fiber optic connection.

In an exemplary embodiment, the contactless connector module 100 allows bi-directional communication across the wireless interface between the first and second fiber optic connector assemblies 102, 104. The RF signals 112 may allow high speed wireless communication. The connector assemblies 102, 104 may maintain the high speed signal path that is typical of communication through a fiber optic cable therethrough, even across the RF path. Optionally, the contactless connector module 100 may allow communication in the Gigabit(s) per second range, such as at up to 10 gigabits per second or more. The communication chips 136, 156 may communicate at a certain frequency range, such as at 60 Gigahertz. The communication chips 136, 156 may have an alignment tolerance greater than an alignment tolerance allowed for fiber optic cable to fiber optic cable communication, which may be approximately 1 micron. For example, the communication chips 136, 156 may have an alignment tolerance of approximately 1 millimeter or more.

Figure 3:
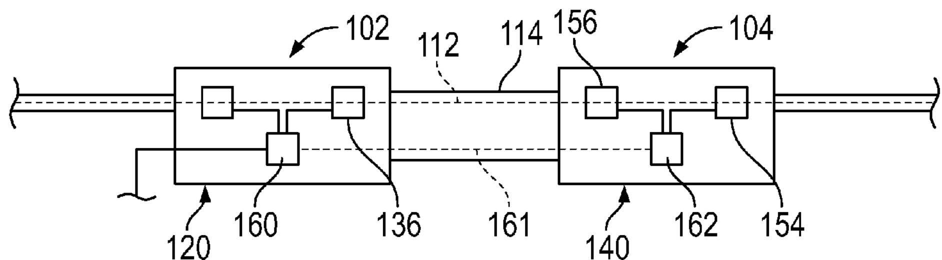
FIG. 3 illustrates first and second fiber optic connector assemblies of the contactless connector module and formed in accordance with an exemplary embodiment.

FIG. 3 illustrates the first and second fiber optic connector assemblies 102, 104 formed in accordance with an exemplary embodiment. The waveguide 114 is positioned between the first and second connectors 120, 140. The waveguide 114 is positioned proximate to the communication chips 136, 156, and receives the RF signals generated by the communication chips 136, 156. The waveguide 114 directs and transmits the RF signals 112 toward the communication chips 136, 156.

In an exemplary embodiment, the first connector 120 includes a power transmitter 160 that receives power from a power source. The power may be used to power components of the first connector 120, such as the converter 134, the communication chip 136 or other components. The power transmitter 160 is configured to generate power signals 161 that are configured to be wirelessly transmitted from the first connector 120 to the second connector 140. The second connector 140 includes a power receiver 162 that receives the electrical energy generated by the power transmitter 160. The waveguide 114 may be used to transmit the power signals between the power transmitter 160 and the power receiver 162. The power received at the power receiver 162 may be used to power components of the second connector 140. For example, the communication chip 156, converter 154 or other components of the second connector 140 may be powered by the power supplied to the first connector 120, which is transmitted wirelessly to the second connector 140. The power receiver 162 may have an inductive coil that is inductively coupled to the power transmitter 160. Optionally, the power signals may be transmitted by the second connector 140 along the fiber optic cable 144.

Figure 4:
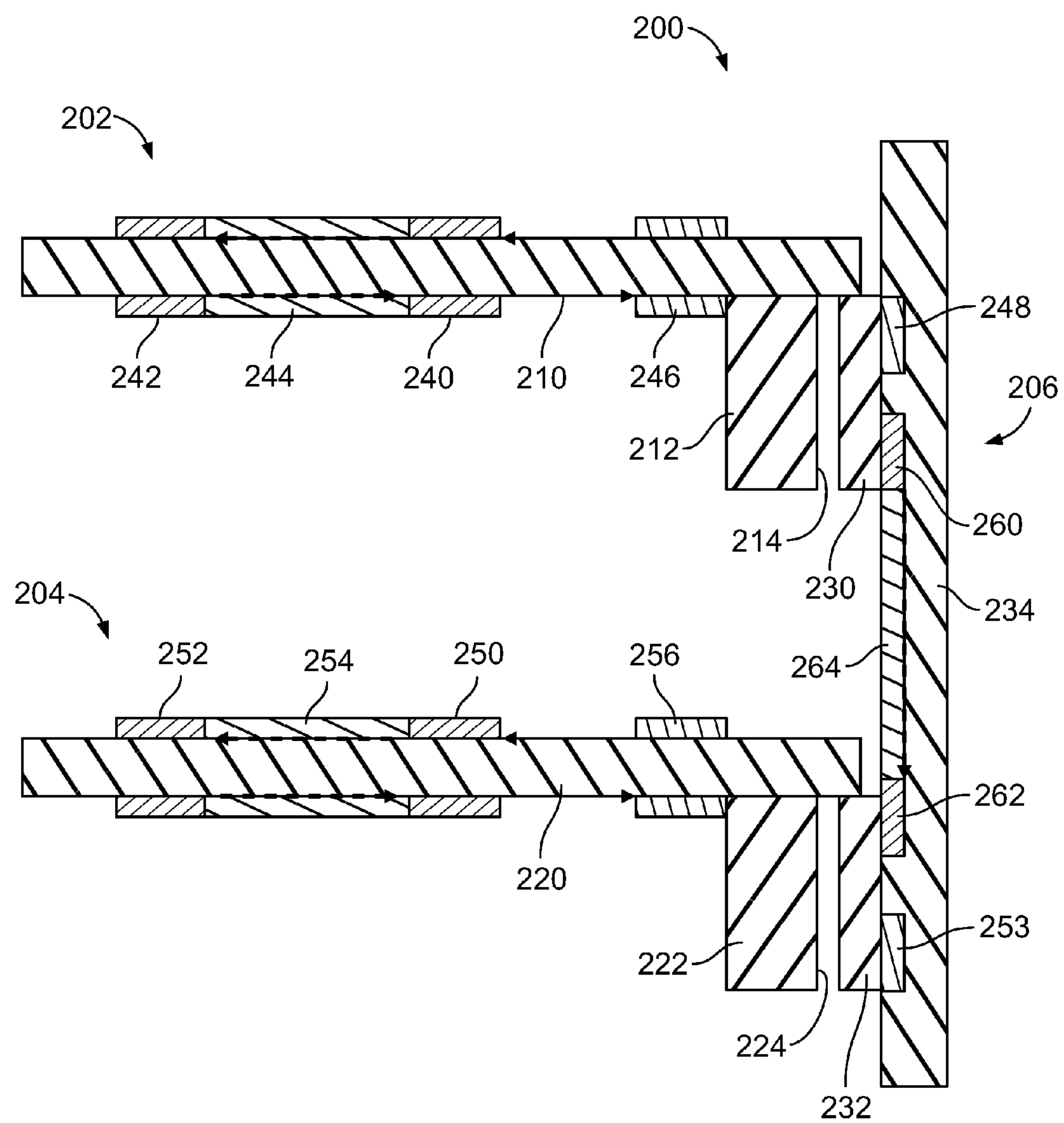
FIG. 4 illustrates a backplane connector system that uses contactless connector modules.

FIG. 4 illustrates a backplane connector system 200 that uses contactless connector modules, such as the contactless connector module 100 (shown in FIG. 1). The backplane connector system 200 includes first and second pluggable card assemblies 202, 204 and a backplane connector assembly 206 formed in accordance with an exemplary embodiment. Each of the pluggable card assemblies 202, 204 as well as the backplane connector assembly 206 may define contactless connector modules.

The pluggable card assembly 202 includes a first connector pluggable card 210 that includes a first housing 212 having a mating end 214. The second backplane connector assembly 204 includes a second connector pluggable card 220 that includes a second housing 222 having a mating end 224. The backplane connector assembly 206 includes housings 230, 232 mounted to a backplane circuit board 234 or simply backplane 234. Optionally, the housings 230, 232 may be cages that receive the entire pluggable card assemblies 202, 204 therein.

The pluggable card 210 includes converters 240, 242 which convert between electrical and optical signals. An optical waveguide or optical fiber 244 of the pluggable card 210 extends between the converters 240, 242. Optical signals are transmitted by the optical waveguide or optical fiber 244 between the converters 240, 242. In an alternative embodiment, rather than transmitting between two converters 240, 242 on the pluggable card 210, the optical fiber 244 may be routed from the pluggable card 210 to another location, such as part of a communication network system. In such embodiment, a single converter 240 or 242 may be provided on the pluggable card 210. The pluggable card assembly 202 includes a communication chip 246. The converters 240, 242 and the communication chip 246 may be mounted to the pluggable card 210. Wireless RF signals may be transmitted between the communication chip 246 and a communication chip 248 of the backplane connector assembly 206. The RF signals may be transmitted through the housings 212, 230. An RF waveguide may be provided within or between the housings 212, 230. The RF signals may be directed in a nonlinear path.

The pluggable card 220 includes converters 250, 252 which convert between electrical and optical signals. An optical waveguide or optical fiber 254 of the pluggable card 220 extends between the converters 250, 252. Optical signals are transmitted by the optical waveguide or optical fiber 254 between the converters 250, 252. In an alternative embodiment, rather than transmitting between two converters 250, 252 on the pluggable card 220, the optical fiber 254 may be routed from the pluggable card 220 to another location, such as part of a communication network system. In such embodiment, a single converter 250 or 252 may be provided on the pluggable card 220. The pluggable card assembly 204 includes a communication chip 256. The converters 250, 252 and the communication chip 256 may be mounted to the pluggable card 220. Wireless RF signals may be transmitted between the communication chip 256 and a communication chip 258 of the backplane connector assembly 206. The RF signals may be transmitted through the housings 222, 232. An RF waveguide may be provided within or between the housings 222, 232. The RF signals may be directed in a nonlinear path.

In an exemplary embodiment, the backplane connector assembly 206 includes converters 260, 262 which convert between electrical and optical signals. An optical waveguide or optical fiber 264 of the backplane 234 extends between the converters 260, 262. Optical signals are transmitted by the optical waveguide or optical fiber 264 between the converters 260, 262. In an alternative embodiment, rather than transmitting between two converters 260, 262 on the backplane 234, the signals may be transmitted between the communication chips 248, 258 as electrical signals along the backplane 234 or may be transmitted wirelessly, such as via RF communication between the chips 248, 258.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

What is claimed is:

1. A contactless connector module comprising:

a fiber optic cable to fiber optic cable connection made with wireless radio frequency (RF) signals between a first fiber optic connector assembly and a second fiber optic connector assembly;

the first fiber optic connector assembly having a first fiber optic cable and a first connector provided at an end of the first fiber optic cable, the first connector comprising a housing having a mating end, the first connector comprising a first converter converting between optical and electrical signals and a first communication chip electrically connected to the first converter, the first communication chip being configured to transmit wireless RF signals; and the second fiber optic connector assembly having a second fiber optic cable and a second connector provided at an end of the second fiber optic cable, the second connector comprising a housing having a mating end, the mating end of the second connector being directly mated with the mating end of the first connector, the second connector comprising a second converter converting between optical and electrical signals and a second communication chip electrically connected to the second converter, the second communication chip being configured to receive the wireless RF signals from the first communication chip;

wherein the wireless RF signals are transmitted within the housings of the first and second connectors.

2. The contactless connector module of claim 1, wherein a data transmission path is defined between the first and second fiber optic cables, the data transmission path comprising the wireless RF signals between the first and second communication chips.

3. The contactless connector module of claim 1, wherein optical signals from the first fiber optic cable are converted to electrical signals by the first converter, the electrical signals being transmitted to the first communication chip, the first communication chip converting the electrical signals to RF signals and wirelessly transmitting the RF signals to the second communication chip.

4. The contactless connector module of claim 1, wherein the first fiber optic connector assembly converts optical signals to wireless RF signals, the first fiber optic connector assembly transmits the RF signals wirelessly to the second fiber optic connector assembly, and the second fiber optic connector assembly converts the RF signals to optical signals.

5. The contactless connector module of claim 1, wherein the second communication chip is configured to transmit wireless RF signals, the first communication chip being configured to receive the wireless RF signals from the second communication chip.

6. The contactless connector module of claim 1, further comprising a RF waveguide between the first communication chip and the second communication chip, the RF waveguide transmitting the RF signals.

7. The contactless connector module of claim 6 wherein the RF waveguide transmits the RF signals along a nonlinear path.

8. The contactless connector module of claim 1, wherein the first connector comprises a circuit board, the first converter being mounted to the circuit board, the first communication chip being mounted to the circuit board, electrical signals being transmitted between the first converter and the first communication chip along the circuit board.

9. The contactless connector module of claim 1, wherein the first connector comprises a power transmitter, the second connector comprises a power receiver, electrical energy being transmitted wirelessly between the power transmitter and the power receiver.

10. A contactless connector module comprising:

a fiber optic cable to fiber optic cable connection made with wireless radio frequency (RF) signals between a first fiber optic connector assembly and a second fiber optic connector assembly;

the first fiber optic connector assembly having a first fiber optic cable and a first connector provided at an end of the first fiber optic cable, the first connector having a housing extending between a cable end and a mating end; and the second fiber optic connector assembly having a second fiber optic cable and a second connector provided at an end of the second fiber optic cable, the second connector having a housing extending between a cable end and a mating end, the mating end of the second connector being directly mated with the mating end of the first connector;

wherein a data transmission path is defined between the first fiber optic cable and the second fiber optic cable, the data transmission path comprising optical signals through the first and second fiber optic cables, the data transmission path comprising wireless RF signals through the first and second connectors;

wherein the first fiber optic connector assembly converts optical signals to wireless RF signals, the first fiber optic connector assembly transmits the RF signals wirelessly to the second fiber optic connector assembly, and the second fiber optic connector assembly converts the RF signals to optical signals.

11. The contactless connector module of claim 10, wherein data signals traveling along the data transmission path enter the housing of the first connector at the cable end thereof as optical signals and the data signals traveling along the data transmission path exit the housing of the first connector at the mating end thereof as wireless RF signals.

12. The contactless connector module of claim 10, wherein the first fiber optic cable transmits optical signals, the optical signals from the first fiber optic cable being converted to electrical signals by a converter of the first connector, the electrical signals being converted to RF signals by a communication chip of the first connector, the RF signals being wirelessly transmitted by communication chip to the second fiber optic connector assembly.

13. The contactless connector module of claim 10, wherein the first connector comprises a first converter converting between optical and electrical signals and a first communication chip electrically connected to the first converter, the first communication chip being configured to transmit wireless RF signals, and wherein the second connector comprises a second converter converting between optical and electrical signals and a second communication chip electrically connected to the second converter, the second communication chip being configured to receive the wireless RF signals from the first communication chip, the wireless RF signals being transmitted within the housings of the first and second connectors.

14. The contactless connector module of claim 10, wherein at least one of the first connector and the second connector comprises a RF waveguide at the mating end thereof, the RF waveguide transmitting the RF signals.

15. A contactless connector module comprising:

a fiber optic cable to fiber optic cable connection made with wireless radio frequency (RF) signals between a first fiber optic connector assembly and a second fiber optic connector assembly;

the first fiber optic connector assembly having a first fiber optic cable and a first connector provided at an end of the first fiber optic cable, the first connector having a housing extending between a cable end and a mating end; and the second fiber optic connector assembly having a second fiber optic cable and a second connector provided at an end of the second fiber optic cable, the second connector having a housing extending between a cable end and a mating end, the mating end of the second connector being directly mated with the mating end of the first connector;

wherein a data transmission path is defined between the first fiber optic cable and the second fiber optic cable, the data transmission path comprising optical signals through the first and second fiber optic cables, the data transmission path comprising wireless RF signals through the first and second connectors;

wherein data signals traveling along the data transmission path enter the housing of the first connector at the cable end thereof as optical signals and the data signals traveling along the data transmission path exit the housing of the first connector at the mating end thereof as wireless RF signals.

16. The contactless connector module of claim 15, wherein data signals traveling along the data transmission path between the cable end and the mating end of the housing of the first connector are electrical signals.

17. The contactless connector module of claim 15, wherein the first fiber optic cable transmits optical signals, the optical signals from the first fiber optic cable being converted to electrical signals by a converter of the first connector, the electrical signals being converted to RF signals by a communication chip of the first connector, the RF signals being wirelessly transmitted by communication chip to the second fiber optic connector assembly.

18. The contactless connector module of claim 15, wherein the first fiber optic connector assembly converts optical signals to wireless RF signals, the first fiber optic connector assembly transmits the RF signals wirelessly to the second fiber optic connector assembly, and the second fiber optic connector assembly converts the RF signals to optical signals.

19. The contactless connector module of claim 15, wherein the first connector comprises a first converter converting between optical and electrical signals and a first communication chip electrically connected to the first converter, the first communication chip being configured to transmit wireless RF signals, and wherein the second connector comprises a second converter converting between optical and electrical signals and a second communication chip electrically connected to the second converter, the second communication chip being configured to receive the wireless RF signals from the first communication chip, the wireless RF signals being transmitted within the housings of the first and second connectors.

20. The contactless connector module of claim 15, wherein at least one of the first connector and the second connector comprises a RF waveguide at the mating end thereof, the RF waveguide transmitting the RF signals.

* * * * *